United States Patent [19]
Chave et al.

[11] Patent Number: 5,269,941
[45] Date of Patent: Dec. 14, 1993

[54] PROCESS AND APPARATUS FOR THE TREATMENT OF EFFLUENTS CONTAINING EMULSION INKS

[75] Inventors: Etienne Chave, Talence; Pierre Langlade, Bordeaux Cauderan; Jean-Claude Pommier, Gradignan, all of France

[73] Assignee: La Cellulose du Pin c/o Saint-Gobain Recherche, Cedex, France

[21] Appl. No.: 908,893

[22] Filed: Jul. 8, 1992

Related U.S. Application Data

[63] Continuation of Ser. No. 545,703, Jun. 29, 1990, abandoned.

[30] Foreign Application Priority Data

Jun. 29, 1989 [FR] France .................. 89 08673

[51] Int. Cl.$^5$ .................. C02F 1/52; B01D 45/12
[52] U.S. Cl. .................. 210/725; 210/727; 210/731; 210/735; 210/738; 210/787; 210/512.1; 210/917
[58] Field of Search .............. 210/724, 725, 726, 727, 210/728, 731, 735, 738, 787, 789, 512.1, 917, 928

[56] References Cited

U.S. PATENT DOCUMENTS

| | | | |
|---|---|---|---|
| 3,557,956 | 1/1971 | Braun | 210/788 |
| 3,835,045 | 9/1974 | Hussissian | 210/709 |
| 3,849,246 | 11/1974 | Raymond et al. | 210/788 |
| 3,868,320 | 2/1975 | Hider et al. | 210/727 |
| 3,959,129 | 5/1976 | White et al. | 210/667 |
| 4,076,578 | 2/1982 | Puddington et al. | |
| 4,391,638 | 7/1983 | Fusco et al. | 210/781 |
| 4,629,477 | 12/1986 | Geke | 210/735 |
| 4,816,164 | 3/1989 | Presley | 210/710 |
| 4,818,284 | 4/1989 | McKelvey | 210/787 |
| 4,874,515 | 10/1989 | McKelvey | 210/360.1 |

FOREIGN PATENT DOCUMENTS 1101301 3/1961 Fed. Rep. of Germany.

OTHER PUBLICATIONS

Database WPIL, No. 83-41189K, Derwent Publications Ltd., London, G.B., & Su-A-937 342 (MOSC MOSVODOKANALNI) Jun. 23, 1982.
Patent Abstracts of Japan, vol. 7, No. 175 (c-179), Mar. 3, 1983; JP-A-58 081 409 (Mitsubishi Jukogyo K.K.) May 16, 1983.
Patent Abstracts of Japan, vol. 8, No. 156 (c-234) [1953], Jul. 19, 1984; & JP∝A-59 059 257 (Mitsubishi Jukogyo K.K.) Apr. 5, 1984.
Tappi, vol. 63, No. 9, Sep. 1980, pp. 113–116; L. Plaizer: "Deinking of secondary fibers." p. 114, middle column, lines 10–12.

*Primary Examiner*—Stanley S. Silverman
*Assistant Examiner*—Neil M. McCarthy
*Attorney, Agent, or Firm*—Oblon, Spivak, McClelland, Maier & Neustadt

[57] ABSTRACT

Effluent containing inks undergoes flocculation by the action of a flocculating agent, followed by the continuous centrifuging of the effluent consisting of an acceleration between 1,000 and 20,000 g, while avoiding an air-liquid interface during centrifuging.

10 Claims, 1 Drawing Sheet

PROCESS AND APPARATUS FOR THE TREATMENT OF EFFLUENTS CONTAINING EMULSION INKS

This application is a continuation of application Ser. No. 07/545,703, filed on Jun. 29, 1990, now abandoned.

BACKGROUND OF THE INVENTION

1. Field of the Invention

This invention relates to the treatment of effluents containing inks, particularly emulsion inks, used in printing processes in printing works and in all other industries such as, e.g., paper, cardboard and similar factories.

2. Background of the Prior Art

In the industries involved in the transformation of paper or cardboard, the effluents to be treated can contain various pollutants and in particular emulsion inks, particularly when the industrial installation uses a flexographic printing process. They may also contain adhesive residues, e.g., based on starch.

In order to treat these effluents, numerous processes have already been proposed. They generally consist of separating by different methods the polluting agents from the water containing them, in order to obtain on one side polluting sludge and on the other the clarified effluent. The polluting sludge obtained is then eliminated, generally by incineration.

Thus, a flocculation-based separating process has been proposed, which is followed by the static decanting of the effluents. However, the sludge obtained through the performance of this process is not very dense, so that the volume to be destroyed is considerable and incineration costs are high.

In order to obtain more compact sludge, it has already been proposed to use a filter press making it possible to pass from a dryness of 2 to 3% to a dryness of approximately 30%. However, one of the disadvantages of the filter press is that its flow rate is variable being linked with the clogging of the cloths, which can occur rapidly.

The filter press also requires manpower for monitoring it, particularly at the time of removing the cake.

In addition, an ultra-filtration separating process has been proposed. However, this is an onerous process and the problem of membrane or cloth clogging again occurs. This can also be irreversible in the case of removal of products such as hydrocarbons, oils and special adhesive.

SUMMARY OF THE INVENTION

The invention proposes a process for the treatment of effluents making it possible to in particular separate the inks from the water containing them and obtain on the one side a clarified effluent and simultaneously on the other side particularly compact sludge.

According to the invention, the effluent is treated with the aid of a flocculating agent and the effluent then undergoes continuous centrifuging involving an acceleration between 1000 and 20,000 g and preferably 1000 and 11,000 g, while avoiding an air-liquid interface during centrifuging.

Within the terms of the invention, continuous centrifuging means centrifuging in which the supply of effluent on the one hand and the discharge of the clarified effluent of the other are continuous, at least between two washing operations.

By avoiding any air-liquid interface during centrifuging, any risk of foam forming due to the presence of air on the surface of the effluent is obviated. The formation of a foam can greatly reduce the efficiency of separation of inks from water.

According to one of the aspects of the invention, flocculation takes place in an acid medium and in particular at a pH between 2 and 6, by using a flocculating agent chosen from among mineral flocculents, such as aluminum sulphate, aluminum sulphate polymers, ferric chloride, as well as organic flocculents such as ionic or non-ionic polymers.

Preferably, flocculation takes place at a pH of approximately 5 by adding an acid, such as sulfuric acid and the flocculating agent is constituted by at least one agent chosen from among the cationic polymers, such as modified or unmodified polyethylene-imines, and aluminum sulphates.

In order to still further improve the flocculation efficiency this can advantageously be carried out in certain cases with an adequate stirring.

The flocculating agent quantity can vary as a function of the type of agent and the type of effluent to be treated. Generally a flocculating agent level of 0.1 to 2% by weight based on the weight of dry matter in the effluent is chosen. The flocculation stage can be very short lasting only a few seconds.

In order to improve the following centrifuging, to the effluent is advantageously added, particularly during flocculation, an antifoaming agent. A suitable antifoaming agent is, e.g., silicone oil.

According to an advantageous feature of the invention, to the effluent is also added a starch-based adhesive, when the effluent does not contain such an adhesive or contains only a very small amount of it. Tests according to the invention have revealed that the presence of a starch adhesive in the effluent further increases the dryness of the sludge obtained by centrifuging. For example, an effluent containing approximately 1 g/l of a starch-based adhesive prior to centrifuging, can be reduced after centrifuging to a sludge volume of approximately 5 to 6% of the total volume of the effluent, the remainder being clarified effluent, whereas an effluent of the same type, but without starch, can only be reduced after centrifuging to a sludge volume of approximately 10%.

It would appear that the starch brings about a compacting of the inks, which appear in flake form after flocculation. This phenomenon is linked with the inventive process, which utilizes a continuous effluent supply to the centrifuge.

The quantity of starch-based adhesive advantageously added to the effluent corresponds to the obtaining of a starch adhesive level, expressed in dry matter in the effluent, between approximately 0.1 and 10 kg/m$^3$ of effluent and preferably between 0.1 and 2 kg/m$^3$.

The invention also relates to an apparatus or installation for the treatment of effluents containing emulsion inks. The apparatus comprises in combination means for mixing the flocculating agent and, if appropriate the other additives, with the effluent, as well as a disk-type industrial centrifuge, positioned downstream of said mixing means and which operates on a full bowl principle, in order to separate the sludge containing the inks from the clarified effluent. A full bowl operation means, according to the invention, that during centrifuging the bowl is full with effluents to be separated and therefore has no air-liquid interface. In such a centrifuge the clarified effluent is continuously separated.

The sludge containing the inks is ejected from the rotating bowl, either continuously through nozzles, or at periodical intervals by opening the bowl.

According to a feature of the apparatus, the mixing means comprises a reaction tank or vessel in which flocculation takes place. If appropriate, the reaction tank can be equipped with a stirrer.

According to a variant, the means for mixing the flocculating agent and, if appropriate the other additives, with the effluent are the supply pipes for the centrifuge, the introduction of the flocculating agent and the other additive taking place directly in said pipe, which then acts as a static mixer.

In another variant, the mixing of the effluent with the flocculating agent and the flocculation can take place both in the supply pipe and in a reaction tank upstream of the centrifuge.

DETAILED DESCRIPTION OF THE INVENTION

The invention can be further understood by reference to the drawings and description set forth below.

Figure 1:
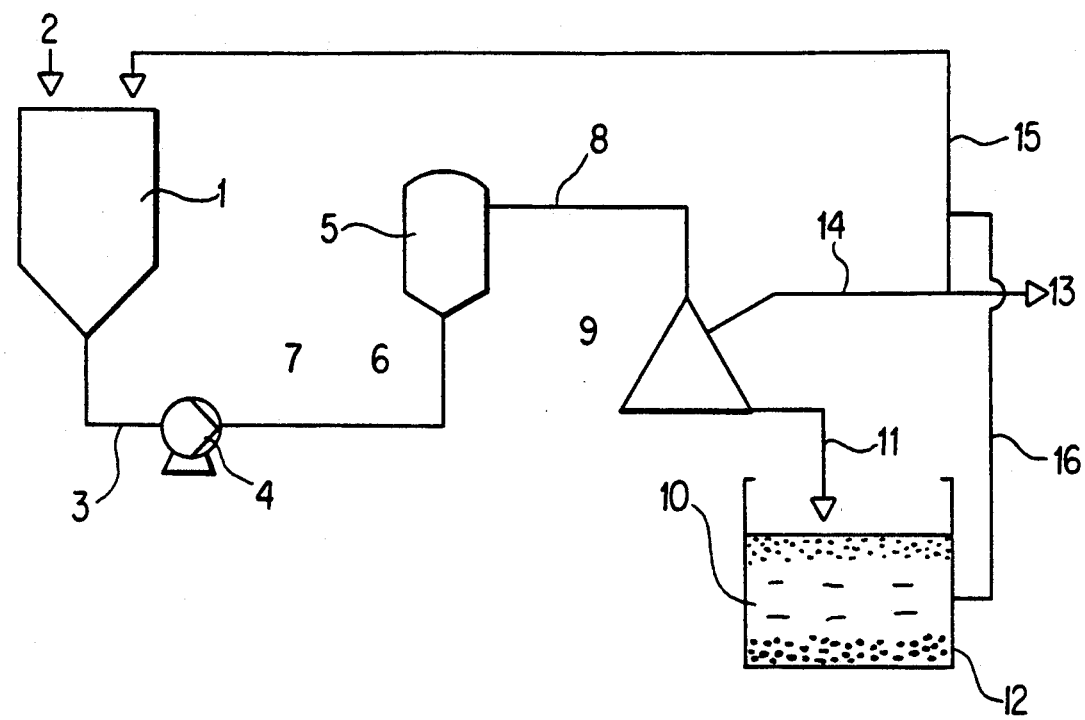
FIG. 1 is a diagrammatic illustration of the treatment apparatus of the invention.

FIG. 1 diagrammatically shows an embodiment of a treatment installation according to the invention. In said FIG. 1, a vessel 1 makes it possible to store the effluents to be treated 2, e.g., flexographic liquors. A pipe 3 incorporating a supply pump 4 is located between the storage vessel 1 and a reaction tank 5, in which the flocculation takes place following the injection or addition of a flocculating agent 6 in pipe 3 upstream of the reaction tank.

Injections or additions of other products or additives 7 can take place in the reaction tank or advantageously in the supply pipe 3 upstream of said tank. In particular, it is possible to inject an acid in order to raise the effluent to the desired pH. It is also possible to add an antifoaming agent and/or a starch-based adhesive at this point.

On leaving the reaction tank 5, the effluent containing the flakes is supplied by the pipe 8 to the centrifugal clarifier or centrifuge 9, which separates the sludge 10 containing the inks discharged by pipe 11 into the sludge tank 12 from the clarified effluents 13 discharged by pipe 14.

The installation according to the embodiment also comprises a pipe 15 permitting the return of the effluents from the centrifuge to the storage tank 1, in the case of an operating incident in the installation and if the effluent is not sufficiently clear.

Another pipe 16 can be provided between the sludge tank and the storage tank, said pipe 16 emanating from the sludge tank at the desired level. Thus, it is necessary to provide for periodic opening of the centrifuge bowl in order to discharge the sludge. This obviously applies for a centrifuge operating by opening circular orifices at periodic intervals for discharging the sludge, but also for a nozzle-equipped centrifuge which, although discharging the sludge on a continuous basis, still requires its bowl to be opened periodically. Whenever the centrifuge bowl is opened, the liquid contained in the bowl is discharged at the same time as the sludge in the sludge tank and it is possible for the sludge tank to contain at an intermediate level between the upper level containing the aerated flakes and the lower level containing the decanted matter, a phase less charged with dry matter, which can then be advantageously recycled and reprocessed.

Although not shown, an auxiliary cleaning circuit can complete the installation.

Figure 2:
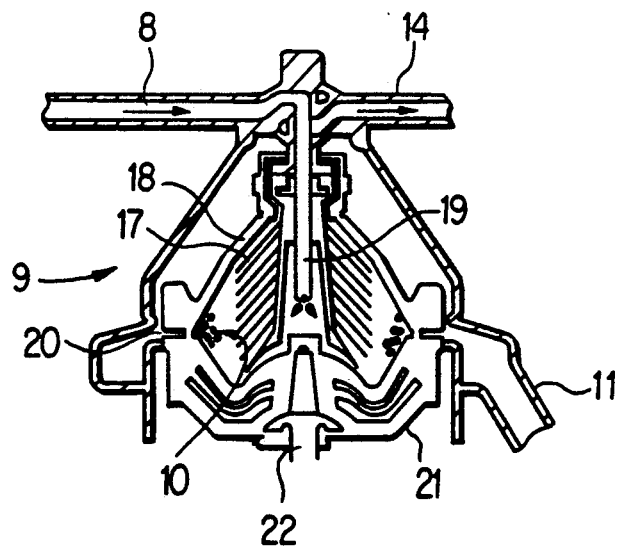
FIG. 2 is a cross-sectional illustration of a centrifuge suitable for use in the invention.

FIG. 2 diagrammatically shows a disk-type centrifuge 9, which can be used in the installation shown in FIG. 1. A suitable centrifuge is, e.g., a periodic ejection separator, also known as an auto-cleaning bowl separator. In such a separator 9 with disks 17, the rotary bowl 18 is biconical. In the junction plane of the cones are located either nozzles, or circular orifices, which can be open or closed. When the circular orifices are closed, the sludge or solids 10 accumulate in the space between the bowl 18 and the disks 17. When they are open, the solids are discharged to the outside. This type of separator is marketed by WESTFALIA SEPARATOR. The supply of effluents 8 containing flakes is continuous and takes place at the center of the bowl by pipe 19. The sludge 10 gradually accumulates in the vicinity of the circular orifice 20 and the clarified effluent 13 is discharged by the discharge pipe 14. On opening the bowl by the action of the piston 21, the sludge 10 is ejected and discharged by pipe 11. The bowl rotating at high speed is driven by the shaft 22. The bowl can be opened and closed manually, or can be programmed for opening at regular intervals, or can be controlled by the separator when the sludge reaches a certain volume.

The invention is applicable to the treatment of different effluents and in particular those of the following types: wash water containing inks for flexographic printing and wash water for flexographic printing containing starch-based adhesive.

When the effluent to be treated contains other pollutants, particularly those which are immiscible with water such as oils, prior to carrying out the process according to the invention, it can be advantageous to carry out other separation treatments on the effluent, e.g., a separation of the oil by florentine.

Other features and advantages of the invention can be gathered from the following examples.

EXAMPLE 1

An effluent containing flexographic printing inks is treated by using the installation shown in FIG. 1. Prior to treatment, said effluent has a dry matter content of 27 g/l. Sulfuric acid is injected into pipe 3 in order to acidify the effluent to pH 5. This is followed by the injection of a flocculating agent, namely polyethyleneimine, at a rate of 1.3 kg of a commercial solution with 25% dry matter per $m^3$. To pipe 3 is also added a silicone oil as an antifoaming agent, at a rate of 125 g of commercial solution per $m^3$. Following a passage in the reaction tank 5, which lasts approximately 10 to 20 seconds, the effluent is passed into the continuously operating centrifuge, e.g., that marketed by WESTFALIA SEPARATOR under the name "Clarifier SA 20".

In said clarifier the effluent undergoes a maximum acceleration of 7,000 g and the effluent flow rate is 0.75 $m^3/h$. On leaving the clarifier, on one side is obtained the clarified effluent discharged by pipe 14 and on the other side is sludge containing the inks, discharged by the pipe 11 in to the sludge tank 12. The sludge in the sludge tank represents 90 g/l and their volume corresponds to approximately 25% of the initial effluent volume. The sludge can be incinerated.

EXAMPLE 2

An effluent containing water-soluble inks for flexographic printing is treated. Prior to treatment, said effluent has a dry matter content of 8.7 g/l. The procedure of Example 1 is followed for all the prior treatments, while adjusting the quantities to the dry matter content of the effluent. The effluent undergoes centrifuging, the effluent flow rate in the centrifuge being regulated to 2 m$^3$/h.

Sludge is obtained with a dry matter content of approximately 90 g/l. The sludge volume corresponds to approximately 9% of the initial effluent volume.

EXAMPLE 3

The effluent of Example 2 is treated by also adding to pipe 3, upstream of the reaction tank 5, a starch-based adhesive at a rate of 1 kg of dry matter per m$^3$ of effluent The effluent then undergoes centrifuging as in Example 2.

Sludge is obtained with a dry matter content of approximately 220 g/l, whose volume corresponds to 4% of the initial effluent volume. Compared with Example 2, it should be noted that the addition of starch greatly improves the sludge compacting process by centrifuging

What is claimed is:

1. A process for the separation of flexographic inks from aqueous effluents, comprising flocculating the effluent by addition of a flocculating agent to the effluent, and then effecting continuous centrifuging of the effluent in a centrifuge at an acceleration between 1,000 and 20,000 g, said centrifuge being full with effluent thereby minimizing the formation of foam which would interfere with the centrifuging, to obtain a sludge containing flocculated flexographic inks and a clarified effluent.

2. The process according to claim 1 wherein said aqueous effluent is acidic.

3. The process according to claim 2, wherein the flocculation is carried out by raising the pH of the effluent to approximately 5 by adding an acid to said effluent and wherein the flocculating agent comprises a cationic polymer selected from the group consisting of modified polyethylene-imines or unmodified polyethylene-imines and mixtures thereof.

4. The process according to claim 1, wherein an antifoaming agent is added to the effluent prior to centrifuging.

5. The process according to claim 1, which further comprises adding a starch-based adhesive to the effluent prior to centrifuging.

6. The process according to claim 5, wherein the starch-based adhesive is added in order to obtain a starch-based adhesive level, expressed as dry matter in the effluent, between 0.1 and 10 kg/m$^3$ of effluent.

7. The process according to claim 1 wherein said acceleration is between 1,000 and 11,000 g.

8. The process according to claim 6, wherein the starch-based adhesive is added in an amount of between 0.1 and 2 kg/m$^3$ of effluent.

9. The process according to claim 4, wherein said antifoaming agent is silicone oil.

10. The process according to claim 2, wherein said effluent is rendered acidic by the addition of sulfuric acid thereto.

* * * * *